United States Patent
Ootake (10) Patent No.: US 7,119,868 B2
(45) Date of Patent: Oct. 10, 2006

(54) LIQUID CRYSTAL DISPLAY DEVICE

(75) Inventor: Toshiya Ootake, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/019,368

(22) Filed: Dec. 23, 2004

(65) Prior Publication Data

US 2005/0105025 A1    May 19, 2005

Related U.S. Application Data

(63) Continuation of application No. PCT/JP03/06673, filed on May 28, 2003.

(30) Foreign Application Priority Data

Jun. 26, 2002    (JP)    ............................ 2002-186080

(51) Int. Cl.
*G02F 1/1335*    (2006.01)
(52) U.S. Cl. ..................................... 349/119; 349/114
(58) Field of Classification Search ................ 349/114, 349/117–119
See application file for complete search history.

(56) References Cited

U.S. PATENT DOCUMENTS

| | | | |
|---|---|---|---|
| 2002/0054269 A1 | 5/2002 | Maeda et al. | ............... 349/113 |
| 2005/0057704 A1* | 3/2005 | Ootake et al. | ............... 349/69 |

FOREIGN PATENT DOCUMENTS

| | | |
|---|---|---|
| EP | 0978752 A1 | 2/2001 |
| EP | 1109053 A2 | 6/2001 |
| JP | 6-337421 | 12/1994 |
| JP | 9-21914 A | 1/1997 |
| JP | 2000-275434 A | 10/2000 |
| JP | 2001-290148 A | 10/2001 |

* cited by examiner

*Primary Examiner*—Dung T. Nguyen
(74) *Attorney, Agent, or Firm*—Oblon, Spivak, McClelland, Maier & Neustadt, P.C.

(57) ABSTRACT

A liquid crystal display device includes an electrode substrate, a liquid crystal layer with no twist, a first retardation plate, a second retardation plate, polarizing plates, and a color filter. The first and second retardation plates have slow axes that are parallel or perpendicular to the alignment direction of liquid crystal molecules. The product of the refractive anisotropy $\Delta n$ of the liquid crystal layer and the thickness d of the liquid crystal layer, the retardation R1 of the first retardation plate and the retardation R2 of the second retardation plate satisfy at least one of the relational expressions:

$$530 \text{ nm} \leq \Delta nd + R1 + R2 \leq 570 \text{ nm},$$

$$-20 \text{ nm} \leq \Delta nd - R1 - R2 \leq 20 \text{ nm},$$

$$255 \text{ nm} \leq \Delta nd - R1 + R2 \leq 295 \text{ nm, and}$$

$$255 \text{ nm} \leq \Delta nd + R1 - R2 \leq 295 \text{ nm}.$$

4 Claims, 6 Drawing Sheets

LIQUID CRYSTAL DISPLAY DEVICE

CROSS-REFERENCE TO RELATED APPLICATIONS

This is a Continuation Application of PCT Application No. PCT/JP03/06673, filed May 28, 2003, which was published under PCT Article 21 (2) in Japanese.

This application is based upon and claims the benefit of priority from prior Japanese Patent Application No. 2002-186080, filed Jun. 26, 2002, the entire contents of which are incorporated herein by reference.

BACKGROUND OF THE INVENTION

1. Field of the Invention

The present invention relates to a liquid crystal display device that effects display, making use of at least one of backlighting and ambient lighting.

2. Description of the Related Art

In recent years, liquid crystal display devices have been applied to a variety of fields including notebook PCs, monitors, car navigation systems, medium-sized and small-sized TVs, and mobile phones. In particular, a reflection-type liquid crystal display device requires no backlight, and has advantages such as low power consumption, thinness and lightness. To make use of these advantages, it is now under consideration to apply the reflection-type liquid crystal display device to a display for a portable device such as a mobile PC.

A reflection-type liquid crystal display device effects display by making use of ambient light. Like paper, the luminance of the display screen varies depending on the environment of illumination. In particular, nothing is visible in darkness. To solve this problem, special attention has recently been paid to a liquid crystal display device that uses a built-in light source as an auxiliary light source in a case where the ambient illumination environment is dark. Examples of this type of liquid crystal display include a backlit semi-transmission-type liquid crystal display device, wherein a built-in light source is disposed behind the display screen, and a frontlit reflection-type liquid crystal display device, wherein a built-in light source is disposed in front of the display screen.

In each of these liquid crystal display devices, in order to realize reduction in thickness and weight, while reducing power consumption, it is necessary to increase the efficiency of use of light as much as possible. Jpn. Pat. Appln. KOKAI Publication No. 2000-193962 (Patent No. 3015792), for instance, proposes a method which uses a polarizing reflection element such as a cholesteric liquid crystal as a reflection layer with high reflection efficiency. A cholesteric polarizing reflection element reflects circularly polarized light in a specific direction, which is included in the light incident on the reflection layer. Since the wavelength range of reflected light varies depending on the helical pitch of the cholesteric liquid crystal, light only in the desired wavelength range can be reflected by stacking a plurality of cholesteric liquid crystal layers with different pitches. In particular, by stacking six or more cholesteric liquid crystal layers, most of the light in the visible light range can be reflected. In this kind of cholesteric polarizing reflection device, compared to an ordinary metal reflection layer of, e.g. aluminum, the amount of absorbed light is small and the light use efficiency is high. The liquid crystal display device that uses the above-described polarizing reflection element can control the transmittance/reflectance of the polarizing reflection element. Thus, a semi-transmission-type liquid crystal display device with high light use efficiency can be provided.

On the other hand, reflection-type liquid crystal display devices or semi-transmission-type liquid crystal display devices, which can be formed of substantially the same material as conventionally used transmission-type liquid crystal display devices, have many merits such as sharing of equipment, reduction in cost of components and reduction in cost of development. These devices have already been put to practical use in mobile phones and personal digital assistants (PDAs). However, these reflection-type or semi-transmission-type liquid crystal display devices have lower light use efficiency than the liquid crystal display device that uses the above-described polarizing reflection device. Consequently, the reflection-type or semi-transmission-type liquid crystal display device has insufficient display characteristics, or consumes much energy in order to operate the light source with high luminance. In particular, in the semi-transmission-type liquid crystal display device, it is difficult to realize both transmission display characteristics and reflection display characteristics with sufficiently high light use efficiency.

Jpn. Pat. Appln. KOKAI Publication No. 11-242226, for instance, proposes various liquid crystal display modes as means for solving the above problem. For example, in a semi-transmission-type liquid crystal display device using a homogeneous mode, pixels are divided into a transmissive region and a reflective region which have different cell gaps, thereby to enhance the light use efficiency. In the homogeneous mode, since the liquid crystal molecules are aligned in the same direction, the structure is simple and optical compensation can easily be effected by using a retardation plate, etc. Therefore, display with high contrast and a wide viewing angle can be realized.

It is confirmed, however, that in the homogeneous mode, compared to a twisted nematic (TN) mode, etc., the variance in optical characteristics is large when there is a variance in the cell gap or retardation plate. It is necessary, therefore, to manage the cell gap, which corresponds to the transmissive/reflective regions, with a small margin in the manufacturing process, and to strictly manage the optical characteristics of the structural components. This poses serious problems in manufacture.

BRIEF SUMMARY OF THE INVENTION

The object of the present invention is to provide, in consideration of the above-described problems, a liquid crystal display device, which can enhance light use efficiency without requiring strict management in a manufacturing process in order to maintain good display characteristics and manufacturing yield.

According to a first aspect of the present invention, there is provided a liquid crystal display device comprising: first and second electrode substrates; a liquid crystal layer held between the first and second electrode substrates and including liquid crystal molecules that are aligned substantially in parallel without twist; first and second retardation plates that are disposed on the first and second electrode substrates on sides opposed to the liquid crystal layer; first and second polarizing plates disposed on the first and second retardation plates; and a color filter disposed in one of the first and second electrode substrates, wherein the second electrode substrate includes a light transmissive section that passes backlight coming in from the second polarizing plate side, the first and second retardation plates have slow axes that are parallel or perpendicular to the alignment direction of the liquid crystal molecules, and the product of the refractive anisotropy Δn of the liquid crystal layer and the thickness d of the liquid crystal layer, the retardation R1 of the first retardation plate and the retardation R2 of the second retardation plate satisfy at least one of the relational expressions: 530 nm≦Δnd+R1+R2≦570 nm, −20 nm≦Δnd−R1−R2≦20 nm, 255 nm≦Δnd−R1+R2≦295 nm, and 255 nm≦Δnd+R1−R2≦295 nm.

According to a second aspect of the present invention, there is provided a liquid crystal display device comprising: first and second electrode substrates; a liquid crystal layer held between the first and second electrode substrates and including liquid crystal molecules that are aligned substantially in parallel without twist; a retardation plate that is disposed on the first electrode substrate on a side opposed to the liquid crystal layer; a polarizing plate disposed on the retardation plate; and a color filter disposed in the first electrode substrate, wherein the second electrode substrate includes a light reflective section that reflects ambient light coming in from the polarizing plate side, the retardation plate has a slow axis that is parallel or perpendicular to the alignment direction of the liquid crystal molecules, and the product of the refractive anisotropy Δn of the liquid crystal layer and the thickness d of the liquid crystal layer, and the retardation R1 of the retardation plate satisfy at least one of the relational expressions: 265 nm≦Δnd+R1≦285 nm, and −10 nm≦Δnd−R1≦10 nm.

According to a third aspect of the present invention, there is provided a liquid crystal display device comprising: first and second electrode substrates; a liquid crystal layer held between the first and second electrode substrates and including liquid crystal molecules that are aligned substantially in parallel without twist; first and second retardation plates that are disposed on the first and second electrode substrates on sides opposed to the liquid crystal layer; first and second polarizing plates disposed on the first and second retardation plates; and a color filter disposed in the first electrode substrate, wherein the second electrode substrate includes a light reflective section that reflects ambient light coming in from the first polarizing plate side and a light transmissive section that passes backlight coming in from the second polarizing plate side, the first and second retardation plates have slow axes that are parallel or perpendicular to the alignment direction of the liquid crystal molecules, and the product of the refractive anisotropy Δn of the liquid crystal layer and the thickness d1, d2 of the liquid crystal layer on the light transmissive section and the light reflective section, the retardation R1 of the first retardation plate and the retardation R2 of the second retardation plate satisfy at least one of the relational expressions: 530 nm≦Δnd1+R1+R2≦570 nm, −20 nm≦Δnd1−R1−R2≦20 nm, 255 nm≦Δnd1−R1+R2≦295 nm, and 255 nm≦Δnd1+R1−R2≦295 nm, and satisfy at least one of the relational expressions: 265 nm≦Δnd2+R1≦285 nm, and −10 nm≦Δnd2−R1≦10 nm.

In these liquid crystal display devices, the product Δnd, Δnd1, Δnd2, and the retardation R1 are set in proper ranges. Therefore, it is possible to enhance light use efficiency, without requiring strict management in a manufacturing process, in order to maintain good display characteristics and manufacturing yield.

DETAILED DESCRIPTION OF THE INVENTION

A semi-transmission-type liquid crystal display device according to a first embodiment of the present invention will now be described in detail with reference to the accompanying drawings.

Figure 1:
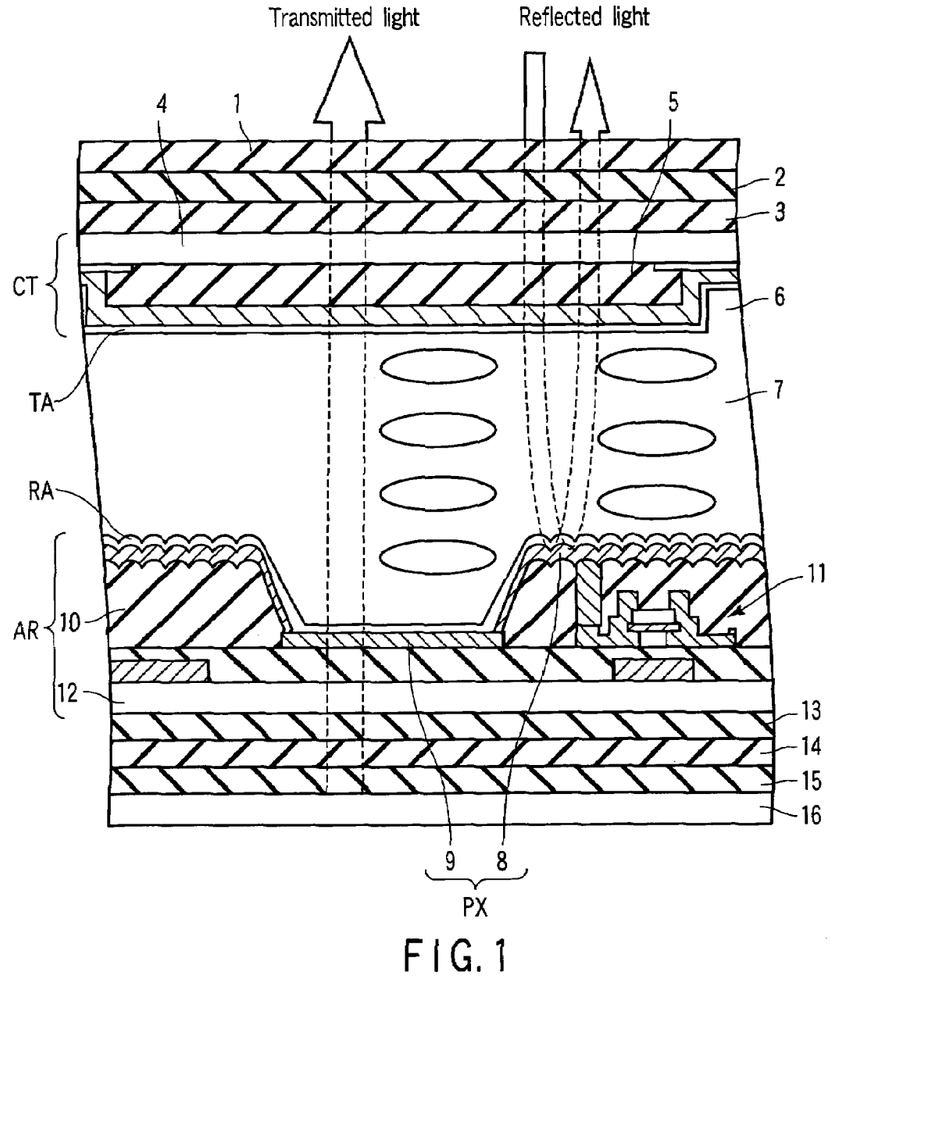
FIG. 1 shows a cross-sectional structure of a liquid crystal display device according to a first embodiment of the present invention.

FIG. 1 shows a cross-sectional structure of the semi-transmission-type liquid crystal display device. The semi-transmission-type liquid crystal display device comprises: first and second electrode substrates CT and AR; a liquid crystal layer 7 held between the electrode substrates AR and CT in which nematic liquid crystal molecules are aligned substantially in parallel, without twist, to the electrode substrates AR and CT; first and second retardation plates 3 and 13 that are disposed on the electrode substrates CT and AR on sides opposed to the liquid crystal layer 7; first and second ½ wavelength plates (hereinafter referred to as λ/2-plates) 2 and 14 disposed on the retardation plates 3 and 13; first and second polarizing plates 1 and 15 that are disposed on the λ/2-plates 2 and 14; and a backlight 16 that is disposed on the polarizing plate 15. The electrode substrate CT includes a glass substrate 4; a color filter 5 disposed on the glass substrate 4 on the liquid crystal layer 7 side; and a transparent counter electrode 6 that is so disposed as to cover the color filter 5. The electrode substrate AR includes a glass substrate 12, a plurality of thin-film transistor (TFT) sections 11 that are disposed on the glass substrate 12 on the liquid crystal layer 7 side; an irregular-surface layer 10 that is disposed on the glass substrate 12 so as to cover the thin-film transistor sections 11; and a plurality of pixel electrodes PX that are arranged on the irregular-surface layer 10 in a matrix and are switched by the thin-film transistor sections 11. The area of each pixel electrode PX is divided into a reflective electrode and a transparent electrode. The pixel electrode PX and counter electrode 6 are covered with first and second alignment films RA and TA, respectively. The λ/2-plates 2 and 14 are retardation plates having a retardation of about 270 nm in the film plane. In order to distinguish these retardation plates from the other retardation plates 3 and 13, the term "λ/2-plate" is used, and the retardation is not limited to this value.

In the liquid crystal display device, backlight passes through the transparent electrode 9 as transmitted light, and ambient light is reflected as reflected light by the reflective electrode 8. The liquid crystal layer 7 effects display by modulating the phases of the transmitted light and reflected light in accordance with a voltage that is applied between the pixel electrode PX and counter electrode 6.

As is shown in FIG. 1, the reflective electrode 8 constitutes a light reflective section, which reflects ambient light that comes in from the polarizing plate 1 side. The transparent electrode 9 constitutes a light transmissive section that passes backlight coming from the polarizer plate 15 side. By means of the irregular-surface layer 10, the liquid crystal layer 7 is provided with different thicknesses at the light transmissive section and light reflective section. The respective thicknesses are properly set in accordance with the kind of liquid crystal that is used as the liquid crystal layer 7. In the first embodiment, a nematic liquid crystal with a refractive anisotropy $\Delta n=0.06$ is used. The thickness of liquid crystal on the light transmissive section is set at $d1=6.0$ m, and the thickness of liquid crystal on the light reflective section is set at $d2=3.2$ µm.

In the state in which no voltage is applied to the liquid crystal layer 7, the liquid crystal molecules are aligned in substantially the same direction. At the time of manufacture, the alignment film RA and alignment film TA are subjected to rubbing treatment in antiparallel directions (i.e. mutually parallel, but opposite, directions). It should suffice if the liquid crystal molecules of the liquid crystal layer 7 are aligned with no substantial twist. The liquid crystal molecules may be set in a bend alignment or vertical alignment by parallel (same-direction) alignment treatment, or the liquid crystal molecules may be aligned parallel to the substrate on one side and vertical to the substrate on the other side.

The optical axes and retardation values of the polarizing plates 1 and 15, λ/2-plates 2 and 14 and retardation plates 3 and 13 are set in accordance with the thickness of the liquid crystal layer 7. Variations of these structural settings are unlimited. The reason is that an infinite number of optically equivalent structures can be created by combinations of the optical axes and retardations. In this case, "equivalent structure" means such a structure that when the polarizing plate 1, λ/2-plate 2 and retardation plate 3 are stuck together, or when the polarizing plate 15, λ/2-plate 14 and retardation plate 13 are stuck together, light incident on the polarizing plate side may have the same polarized state when it goes out from the retardation plate 3 or 13. First to fourth retardation plate structures (S1) to (S4), which are typical ones, are described below.

(S1) The slow axis of the retardation plate 3 and the slow axis of the retardation plate 13 are parallel to the alignment direction of liquid crystal molecules of the liquid crystal layer 7.

(S2) The slow axis of the retardation plate 3 and the slow axis of the retardation plate 13 are perpendicular to the alignment direction of liquid crystal molecules of the liquid crystal layer 7.

(S3) The slow axis of the retardation plate 3 is perpendicular to the alignment direction of liquid crystal molecules of the liquid crystal layer 7, and the slow axis of the retardation plate 13 is parallel to the alignment direction of liquid crystal molecules of the liquid crystal layer 7.

(S4) The slow axis of the retardation plate 3 is parallel to the alignment direction of liquid crystal molecules of the liquid crystal layer 7, and the slow axis of the retardation plate 13 is perpendicular to the alignment direction of liquid crystal molecules of the liquid crystal layer 7.

The present invention is not limited to the above four retardation plate structures (S1) to (S4). The invention is applicable to all structures equivalent to the retardation plate structures (S1) to (S4).

Figure 2:
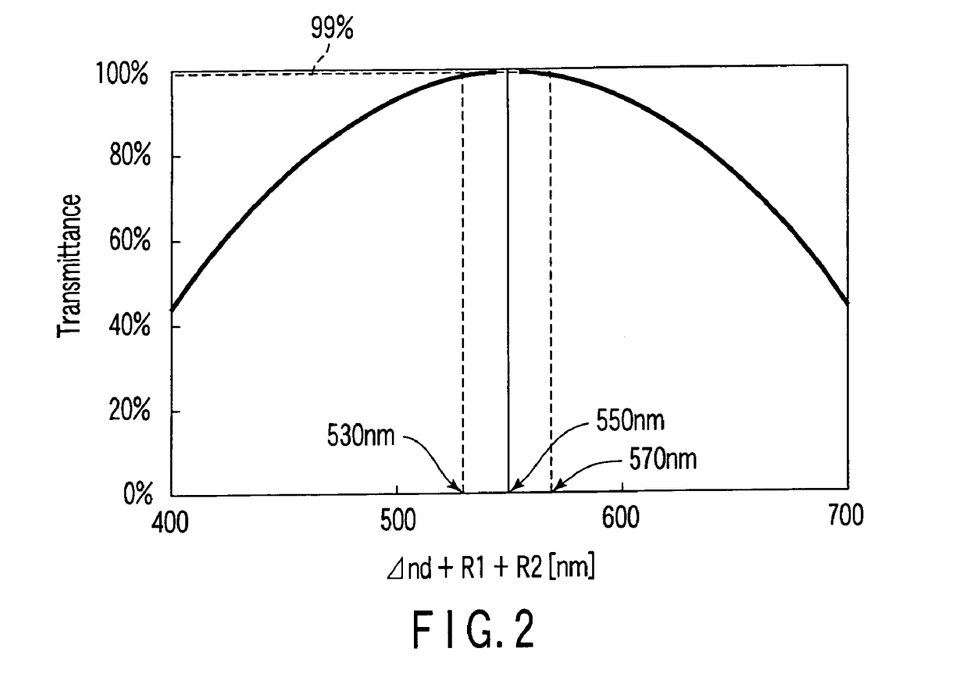
FIG. 2 illustrates the relationship between the transmittance of the liquid crystal display device shown in FIG. 1, the light transmissive section cell gap, and the retardation of the retardation plate, in relation to the structure of the first retardation plate.
Figure 3:
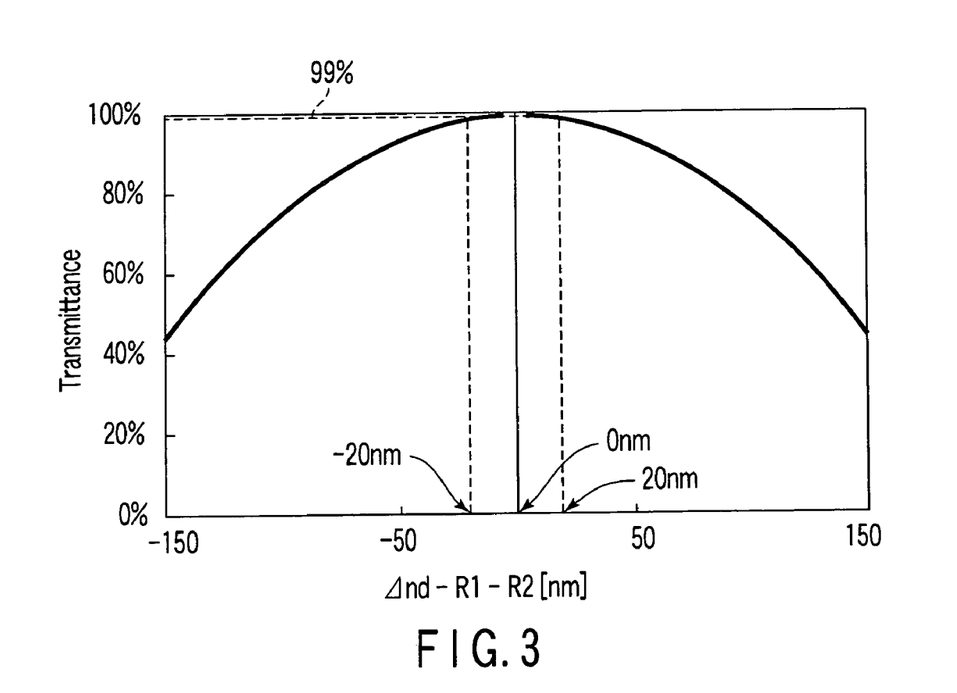
FIG. 3 illustrates the relationship between the transmittance of the liquid crystal display device shown in FIG. 1, the light transmissive section cell gap, and the retardation of the retardation plate, in relation to the structure of the second retardation plate.
Figure 4:
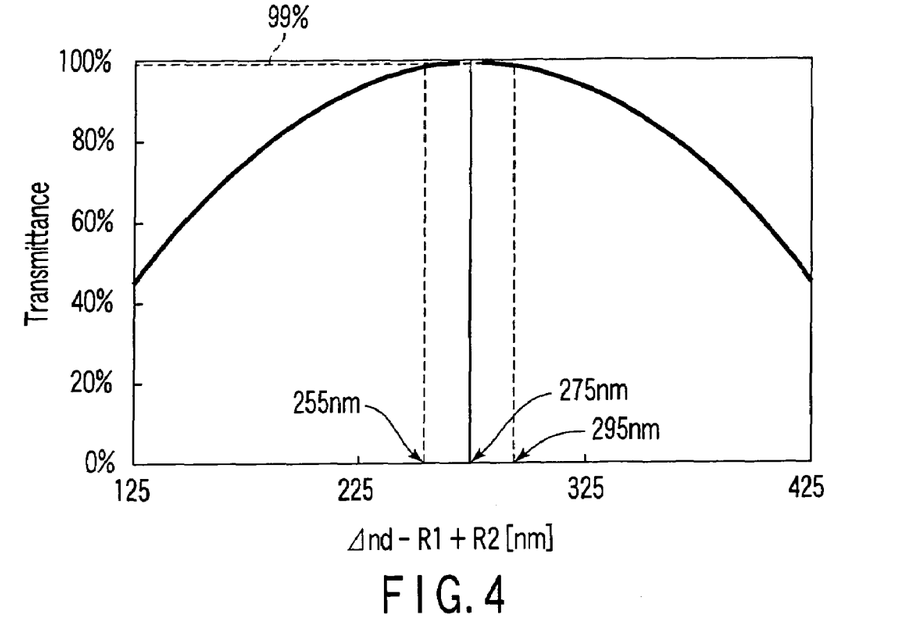
FIG. 4 illustrates the relationship between the transmittance of the liquid crystal display device shown in FIG. 1, the light transmissive section cell gap, and the retardation of the retardation plate, in relation to the structure of the third retardation plate.
Figure 5:
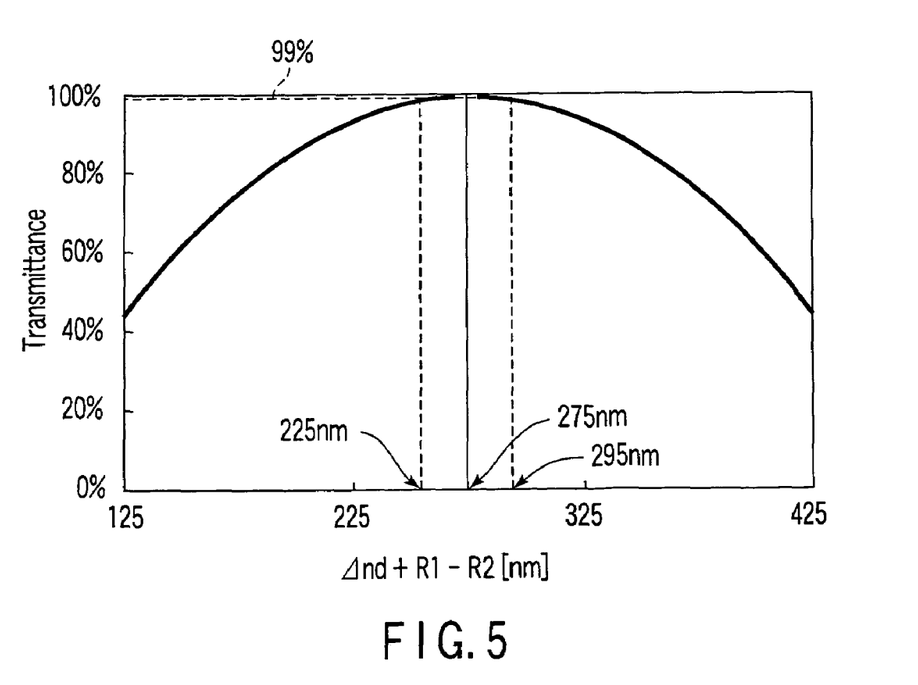
FIG. 5 illustrates the relationship between the transmittance of the liquid crystal display device shown in FIG. 1, the light transmissive section cell gap, and the retardation of the retardation plate, in relation to the structure of the fourth retardation plate.
Figure 6:
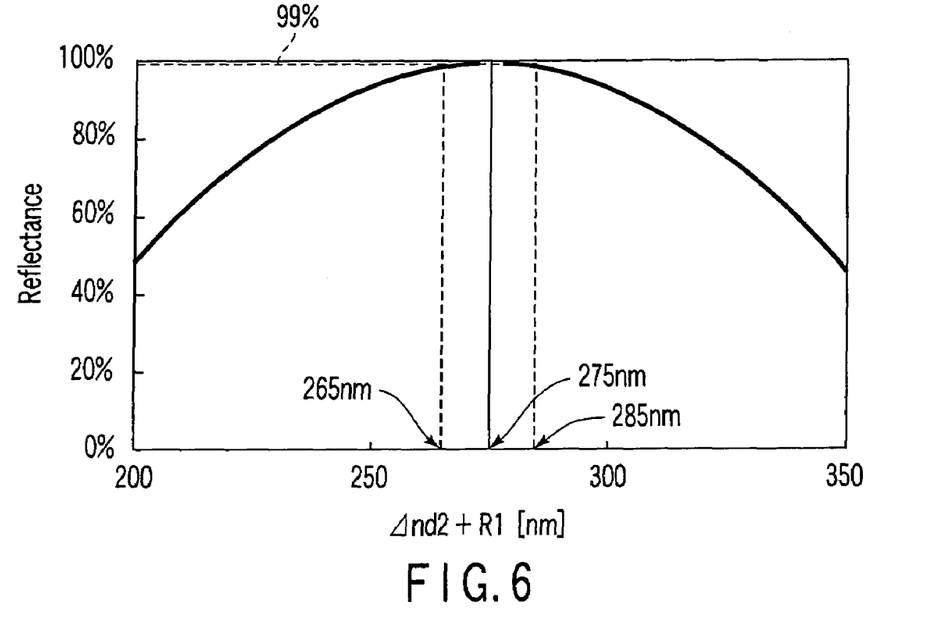
FIG. 6 illustrates the relationship between the reflectance of the liquid crystal display device shown in FIG. 1, the light reflective section cell gap, and the retardation of the retardation plate.
Figure 7:
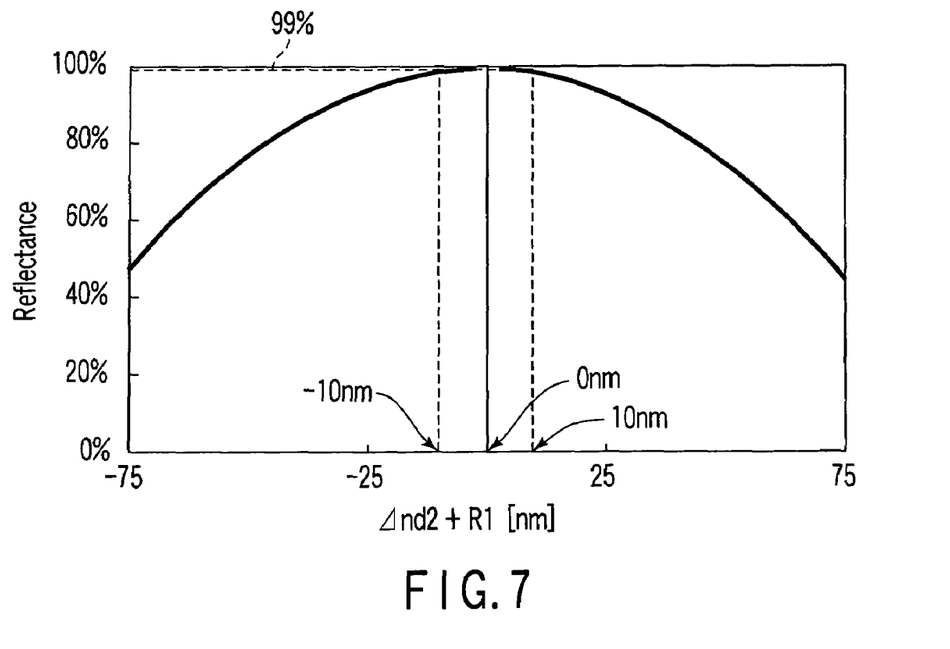
FIG. 7 illustrates the relationship between the reflectance of the liquid crystal display device shown in FIG. 1, the light reflective section cell gap, and the retardation of the retardation plate.

FIGS. 2 to 5 show the relationship between the transmittance and $\Delta n \times d1$ of the liquid crystal display device, and retardation values R1 and R2 of the retardation plates 3 and 13, in association with the retardation plate structures (S1) to (S4). FIGS. 6 and 7 show the relationship between the transmittance and $\Delta n \times d2$ of the liquid crystal display device, and retardation value R1 of the retardation plate 3. In FIGS. 2 to 7, the transmittance and reflectance are normalized at maximum values. In the description below, assume that the transmittance and reflectance are normalized in this way, unless otherwise mentioned. As is shown in FIGS. 2 to 5, in each of the retardation plate structures (S1) to (S4), the transmittance, on the one hand, and $\Delta nd1$, R1 and R2, on the other, have a constant relationship. The conditions for achieving a transmittance of 99% or more, which can realize display characteristics that are by no means inferior to the case of maximum transmittance, are as follows:

$$S1: 530 \text{ nm} \leq \Delta nd1 + R1 + R2 \leq 570 \text{ nm} \tag{1}$$

$$S2: -20 \text{ nm} \leq \Delta nd1 - R1 - R2 \leq 20 \text{ nm} \tag{2}$$

$$S3: 255 \text{ nm} \leq \Delta nd1 - R1 + R2 \leq 295 \text{ nm} \tag{3}$$

$$S4: 255 \text{ nm} \leq \Delta nd1 + R1 - R2 \leq 295 \text{ nm} \tag{4}$$

Similarly, as shown in FIGS. 6 and 7, the conditions for achieving a reflectance of 99% or more, which can realize display characteristics that are by no means inferior to the case of maximum reflectance, are as follows:

$$265 \text{ nm} \leq \Delta nd2 + R1 \leq 285 \text{ nm} \tag{5}$$

$$-10 \text{ nm} \leq \Delta nd2 - R1 \leq 10 \text{ nm} \tag{6}$$

If Δnd1, Δnd2, R1 and R2 are determined so as to meet at least one of the conditions (1) to (4) and at least one of the conditions (5) and (6), a liquid crystal display device with high light use efficiency can be obtained. For example, in the present embodiment, the respective values in the retardation plate structure (S1) are set as follows: Δn 0.06, d1=6.0 μm, d2=3.2 μm, R1=85 nm, and R2=105 nm. Thereby, the liquid crystal display device of this embodiment has the values: Δnd1+R1+R2=550 nm, and Δnd2+R1=277 nm.

Figure 8:
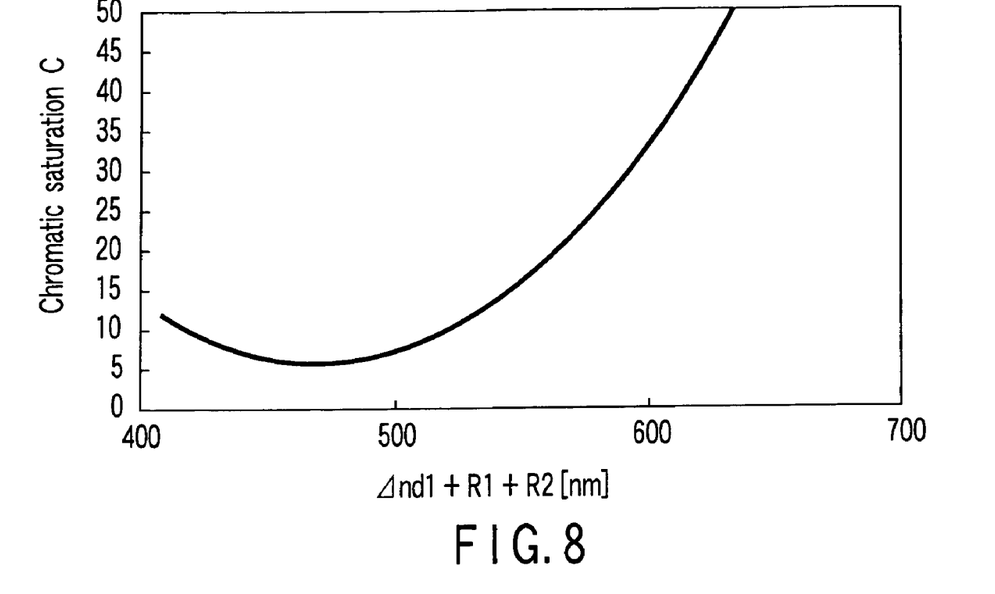
FIG. 8 illustrates the relationship between the transmission white display saturation of the liquid crystal display device shown in FIG. 1, the light transmissive section cell gap, and the retardation of the retardation plate, without inclusion of the color filter and backlight.

FIG. 8 illustrates the variation in coloring of transmission white display in the case where the values Δnd1, Δnd2, R1 and R2 are varied, with the color filter 5 being excluded from the liquid crystal display device of the present embodiment. The ordinate indicates the chromatic saturation C, which is calculated by the equation below, with the backlight 16 used as a reference:

$$C = (a^2 + b^2)^{1/2} \tag{7}$$

where $a = 500 \, ((X/Xbl)^{1/3} - (Y/Ybl)^{1/3})$
$b = 200 \, ((Y/Ybl)^{1/3} - (Z/Zbl)^{1/3})$ The values X, Y and Z and values Xbl, Ybl and Zbl are tristimulus values that are expressed by the XYZ color system of the liquid crystal display device (converted to values at an aperture ratio of 100%) and the backlight 16.

As shown in FIG. 8, the coloring takes a minimum value at a point near Δnd1+R1+R2=480 nm. Although not shown, the coloring becomes yellowish as the value increases from 480 nm, and becomes bluish as the value decreases from 480 nm. Thus, in the case where the value is set so as to obtain the maximum transmittance, as in the present embodiment, the white is displayed as being yellowish.

Further, the saturation curve in FIG. 8 is steep at a point near Δnd1+R1+R2=550 nm. Consequently, if there is a variance in fabrication in the cell gap, retardation R1, R2, or in the axis angle of each structural component, liquid crystal displays with very different display appearances would be formed, and the manufacturing yield would decrease.

In solving this problem, it is effective to shift the saturation curve in FIG. 8 such that the curve takes a minimum value at Δnd1+R1+R2=530 nm to 570 nm. To achieve this, the chromaticity of the color filter layer 5 and the chromaticity of the backlight 16, which are not considered in the case of FIG. 8, are adjusted.

In general, color filters and backlights for use in liquid crystal display devices have various wavelength dispersion characteristics. The chromaticity, which is obtained by combining these elements, varies in a complex manner depending on the difference in wavelength dispersion characteristics, and it cannot be expressed by a simple formula. However, the inventors have obtained enormous data by combining a variety of color filters, backlights, liquid crystals and retardation plates, and found that there is a certain tendency. In the liquid crystal display device of this embodiment, the above-mentioned problem is almost solved when the following relationships are established.

The color filter layer 5 and backlight 16 are adjusted such that the chromaticity coordinates (x1, y1) of emission light, in a case where light from the backlight 16 is made incident on the color filter layer 5, meets the relationships, $$0.290 \leq x1 \leq 0.310 \tag{8}$$

$$0.280 \leq y1 \leq 0.300 \tag{9}$$

where x1=3.00 and y1=0.290 in the present embodiment. FIG. 5 shows chromatic saturation characteristics of transmission white display of the liquid crystal display device of the present embodiment. In this case, however, measurement was conducted with the inclusion of the backlight 16 and color filter layer 5. In addition, assuming that light from a D65 light source, which is standard ambient light, is radiated, the saturation was calculated on the basis of this standard light. The D65 light source is one of standard light sources that are determined by the CIE (Commission Internationale de l'Eclairage).

Figure 9:
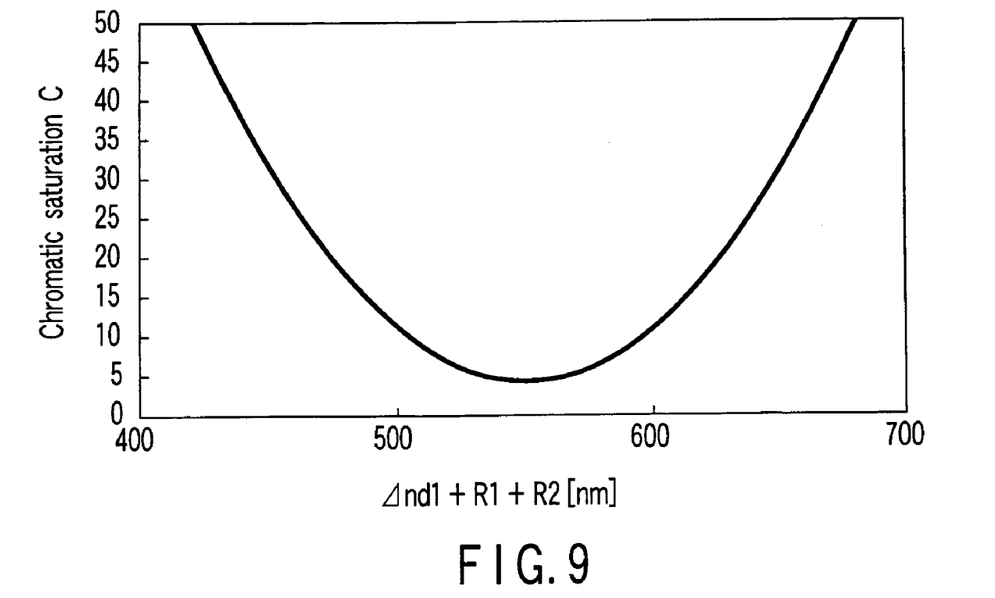
FIG. 9 illustrates the relationship between the transmission white display saturation of the liquid crystal display device shown in FIG. 1, the light transmissive section cell gap, and the retardation of the retardation plate, with inclusion of the color filter and backlight.
Figure 10:
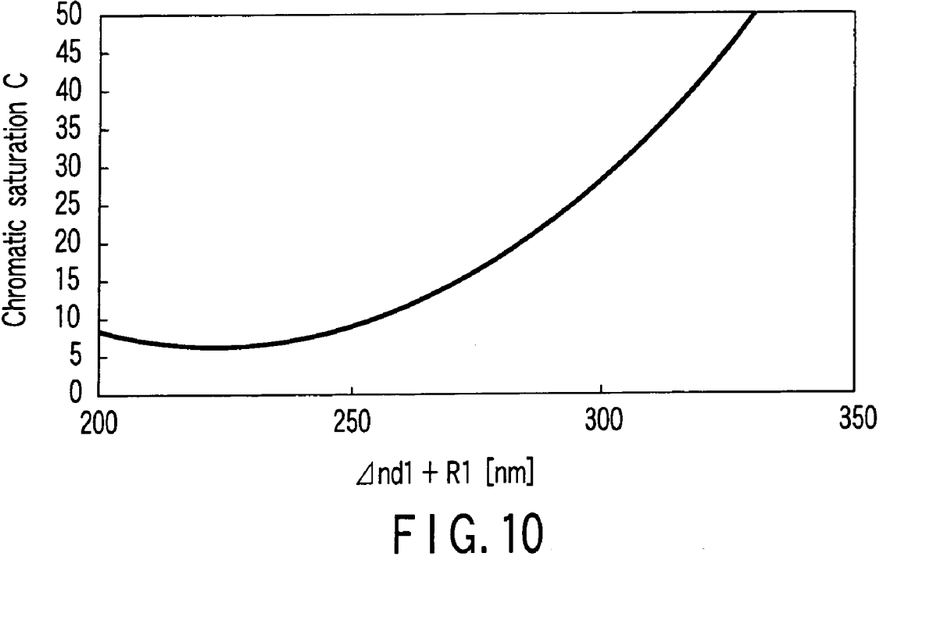
FIG. 10 illustrates the relationship between the reflection white display saturation of the liquid crystal display device shown in FIG. 1, the light reflective section cell gap, and the retardation of the retardation plate, without inclusion of the color filter.
Figure 11:
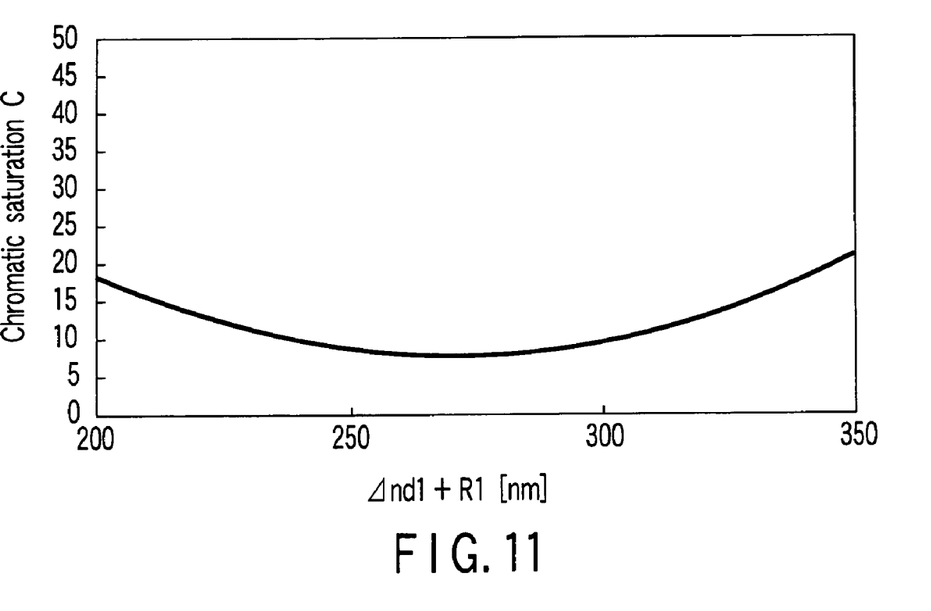
FIG. 11 illustrates the relationship between the reflection white display saturation of the liquid crystal display device shown in FIG. 1, the light reflective section cell gap, and the retardation of the retardation plate, with inclusion of the color filter.

As is shown in FIG. 9, the saturation takes a minimum value at Δnd1+R1+R2=550 nm, and the coloring is minimum. Further, the variance in color due to a variance in fabrication is also minimum.

The present invention is not limited to the retardation plate structure (S1), with which the above results are obtained. With the retardation plate structures (S2), (S3) and (S4) or other structures equivalent to the retardation plate structures (S1) to (S4), the same problem occurs and the problem is solved by similarly setting the backlight 16 and color filter 5.

The coloring of reflection can similarly be considered.

FIG. 6 shows chromatic saturation characteristics of reflection white display in a case where the color filter layer 5 is excluded. In the case of reflection, reflected light, which is obtained when light from the D65 light source, in lieu of the backlight, is radiated, was evaluated. As is clear from FIG. 6, the saturation curve takes a minimum value at Δnd2+R1=240 nm, and the coloring becomes yellowish near Δnd2+R1=275 nm, with a high ratio of variation.

The inventors have also analyzed enormous data and found that in the case of reflection, the above-mentioned problem is solved when the chromaticity coordinates (x2, y2) of emission light, in a case where light from the standard D65 light source is twice passed as ambient light through the color filter layer 5, meets the relationships, $$0.290 \leq x2 \leq 0.310 \tag{10}$$

$$0.280 \leq y2 \leq 0.300 \tag{11}$$

Specifically, the color filter layer 5 is set to meet x2=0.300 and y2=0.290. FIG. 7 shows chromatic saturation characteristics that are obtained with this setting. As is shown in FIG. 7, the saturation takes a minimum value at Δnd2+R1=275 nm, the coloring decreases and the variation is minimum.

As is described above, the color filter layer 5 needs to be designed differently between the case of transmissive display and the case of reflective display. Ideally, it is desirable to meet the above conditions without altering the structure and material of the color filter layer 5 in the light transmissive section and light reflective section. To achieve this, it is necessary to strictly match the wavelength dispersion of red, green and blue of the color filter layers and the wavelength dispersion of the backlight 16.

In addition, in order to decrease restrictions on the color filter material and backlight member, the structure and material of the color filter layer 5 may be made different between the light transmissive section and light reflective section. For example, it is possible to vary the thickness of the color filter layer 5 between the light transmissive section and light reflective section, to make the ratio in area of red, green and blue pixels different, or to use different color filter materials between the light transmissive section and light reflective section. In addition, it is possible to partially include pores in the color filter layer of the light reflective section, thereby to substantially adjust colors.

In the above-described semi-transmission-type liquid crystal display device, equivalent color display can be realized both for transmissive display and reflective display.

Next, a liquid crystal display device according to a second embodiment of the present invention will be described. This liquid crystal display device is a transmission-type liquid crystal display device, wherein the light reflective section in the first embodiment is excluded. Thus, this liquid crystal display device can be obtained by removing the reflective electrode 8 and irregular-surface layer 10 in FIG. 1. In the other structural aspects, the light transmissive section is manufactured like that of the first embodiment, and detailed description is omitted here. In the present embodiment, by virtue of the absence of the light reflective section, the color filter and backlight can be chosen more freely. By making settings for this liquid crystal display so as to meet the conditions relating to the transmissive display as described in connection with the first embodiment, a transmission-type liquid crystal display device with high luminance and low coloring can be manufactured with high manufacturing yield.

A liquid crystal display device according to a third embodiment of the present invention will now be described. This liquid crystal display device is a reflection-type liquid crystal display device, wherein the light transmissive section in the first embodiment is excluded. Thus, this liquid crystal display device can be obtained by removing the transparent electrode 9, second retardation plate 13, second λ/2-plate 14, second polarizing plate 15 and backlight 16 in FIG. 1. In the other structural aspects, the light reflective section is manufactured like that of the first embodiment, and detailed description is omitted here. In the present embodiment, by virtue of the absence of the light transmissive section, the color filter can be chosen more freely. By making settings for this liquid crystal display so as to meet the conditions relating to the reflective display as described in connection with the first embodiment, a reflection-type liquid crystal display device with high luminance and low coloring can be manufactured with high manufacturing yield.

The present invention is not limited to the above-described embodiments, and various modifications can be made without departing from the spirit of the invention. For example, the λ/2-plates 2 and 14 may be dispensed with. In order to enhance contrast, a new retardation plate may be added. Moreover, if a wide viewing angle is needed because of the use of the liquid crystal display device, a plurality of viewing-angle compensation films may additionally be inserted.

In the embodiments, the liquid crystal layer is configured to be driven by TFTs. Alternatively, the liquid crystal layer may be driven by thin film diodes (TFDs), or may be driven by a simple matrix scheme. In this case, the manufacturing yield can be further increased, and the luminance is enhanced with a low aperture ratio. Furthermore, the power consumption is reduced.

The present invention can be utilized to enhance light use efficiency of a liquid crystal display device, without requiring strict management in a manufacturing process in order to maintain good display characteristics and manufacturing yield.

What is claimed is:

1. A liquid crystal display device comprising:
   first and second electrode substrates;
   a liquid crystal layer held between the first and second electrode substrates and including liquid crystal molecules that are aligned substantially in parallel without twist;
   first and second retardation plates that are disposed on the first and second electrode substrates on sides opposed to the liquid crystal layer;
   first and second polarizing plates disposed on the first and second retardation plates; and
   a color filter disposed in one of the first and second electrode substrates;
   wherein the second electrode substrate includes a light transmissive section that passes backlight coming in from the second polarizing plate side, the first and second retardation plates have slow axes that are parallel or perpendicular to the alignment direction of the liquid crystal molecules, and a product of a refractive anisotropy Δn of the liquid crystal layer and a thickness d of the liquid crystal layer, a retardation R1 of the first retardation plate and a retardation R2 of the second retardation plate satisfy at least one of relational expressions:

$530 \text{ nm} \leq \Delta nd + R1 + R2 \leq 570 \text{ nm}$, $-20 \text{ nm} \leq \Delta nd - R1 - R2 \leq 20 \text{ nm}$, $255 \text{ nm} \leq \Delta nd - R1 + R2 \leq 295 \text{ nm}$, and $255 \text{ nm} \leq \Delta nd + R1 - R2 \leq 295 \text{ nm}$, wherein chromaticity coordinates (x, y) of transmitted light, when the backlight passes through the color filter layer, are within ranges of $0.290 \leq x \leq 0.310$, and $0.280 \leq y \leq 0.300$.

2. A liquid crystal display device comprising:
   first and second electrode substrates;
   a liquid crystal layer held between the first and second electrode substrates and including liquid crystal molecules that are aligned substantially in parallel without twist;
   a retardation plate that is disposed on the first electrode substrate on a side opposed to the liquid crystal layer;
   a polarizing plate disposed on the retardation plate; and
   a color filter disposed in the first electrode substrate;
   wherein the second electrode substrate includes a light reflective section that reflects ambient light coming in from the polarizing plate side, the retardation plate has a slow axis that is parallel or perpendicular to the alignment direction of the liquid crystal molecules, and a product of a refractive anisotropy Δn of the liquid crystal layer and a thickness d of the liquid crystal layer, a retardation R1 of the retardation plate satisfy at least one of relational expressions:

$265 \text{ nm} \leq \Delta nd + R1 \leq 285 \text{ nm}$, $-10 \text{ nm} \leq \Delta nd - R1 \leq 10 \text{ nm}$, wherein chromaticity coordinates (x, y) of transmitted light, when light from a standard D65 light source is twice passed as the ambient light through the color filter layer, are within ranges of $0.290 \leq x \leq 0.310$, and $0.280 \leq y \leq 0.300$.

3. A liquid crystal display device comprising:
   first and second electrode substrates;
   a liquid crystal layer held between the first and second electrode substrates and including liquid crystal molecules that are aligned substantially in parallel without twist;
   first and second retardation plates that are disposed on the first and second electrode substrates on sides opposed to the liquid crystal layer;
   first and second polarizing plates disposed on the first and second retardation plates; and a color filter disposed in the first electrode substrate;

wherein the second electrode substrate includes a light transmissive section that passes backlight coming in from the second polarizing plate side, and a light reflective section that reflects ambient light coming in from the first polarizing plate side, the first and second retardation plates have slow axes that are parallel or perpendicular to the alignment direction of the liquid crystal molecules, and a product of a refractive anisotropy $\Delta n$ of the liquid crystal layer and a thickness d1, d2 of the liquid crystal layer on the light transmissive section and the light reflective section, a retardation R1 of the first retardation plate and a retardation R2 of the second retardation plate satisfy at least one of relational expressions:

530 nm $\leq \Delta nd1+R1+R2 \leq$ 570 nm,

−20 nm $\leq \Delta nd1-R1-R2 \leq$ 20 nm, 255 nm $\leq \Delta nd1-R1+R2 \leq$ 295 nm, and 255 nm $\leq \Delta nd1-R1+R2 \leq$ 295 nm, and satisfy at least one of relational expressions:

265 nm $\leq \Delta nd2-R1 \leq$ 285 nm, and

−10 nm $\leq \Delta nd2-R1 \leq$ 10 nm, wherein chromaticity coordinates (x, y) of transmitted light, when the backlight passes through the color filter layer, and transmitted light, when light from a standard D65 light source is twice passed as the ambient light through the color filter layer, are within ranges of $0.290 \leq x \leq 0.310$, and $0.280 \leq y \leq 0.300$.

4. The liquid crystal display device according to claim 3, wherein the color filter exhibits different chromaticity characteristics between regions, which are associated with the light transmissive section and the light reflective section, in relation to the same light source.

* * * * *